United States Patent [19]

Kriesels

[11] Patent Number: 5,085,302

[45] Date of Patent: Feb. 4, 1992

[54] MARINE REVERSE REDUCTION GEARBOX

[75] Inventor: Peter C. Kriesels, Rio, Wis.

[73] Assignee: The Falk Corporation, Milwaukee, Wis.

[21] Appl. No.: 628,875

[22] Filed: Dec. 18, 1990

[51] Int. Cl.$^5$ .............................................. F16H 3/14
[52] U.S. Cl. .................................................. 192/51; 74/361
[58] Field of Search ............... 74/361, 860; 192/20, 192/21, 51; 440/86

[56] References Cited

U.S. PATENT DOCUMENTS

| | | | |
|---|---|---|---|
| 2,749,776 | 6/1956 | Fischer et al. | 74/740 |
| 2,839,170 | 6/1958 | Grant | 192/51 |
| 2,892,356 | 6/1959 | Sinclair | 74/361 |
| 3,157,057 | 11/1964 | Palmer et al. | 192/51 |
| 3,184,023 | 5/1965 | Hovde | 192/51 |
| 3,363,732 | 1/1968 | Nakamura et al. | 192/4 |
| 3,543,891 | 12/1970 | Mathers | 192/94 |
| 3,548,987 | 12/1970 | Erickson et al. | 192/51 X |
| 4,051,679 | 10/1977 | Collin | 60/656 |
| 4,252,034 | 2/1981 | DeBruyne | 74/675 |
| 4,305,710 | 12/1981 | Schneider | 440/75 |
| 4,316,722 | 2/1982 | Aschauer | 440/74 |
| 4,338,525 | 7/1982 | Kilgore | 290/17 |
| 4,384,639 | 5/1983 | Collin | 192/4 C |
| 4,451,238 | 5/1984 | Arnold | 440/75 |
| 4,458,799 | 7/1984 | Schueller | 192/72 |
| 4,688,665 | 8/1987 | Rowen | 440/86 X |

*Primary Examiner*—Dirk Wright
*Attorney, Agent, or Firm*—William D. Lanyi

[57] ABSTRACT

A marine reduction gearbox, or transmission, is provided with variably engageable clutches connected in torque transmitting relation between a prime mover and a propeller shaft. These variably engageable clutches permit the prime mover to be connected to the propeller shaft in partial torque transmitting association. One advantage of this type of apparatus is that the prime mover can be partially loaded during crash reversal procedures while the propeller shaft is still and inhibited from rotating by the action of a brake. This preloading of the prime mover while at idle speed increases the power output of the prime mover and prepares it for an eventual connection to a rotatable propeller shaft with the brake disengaged or partially disengaged. This procedure prevents the stalling of the prime mover, especially when the prime mover is a high break mean effective pressure engine. A second advantage of the use of a variably engageable clutch is that a marine vessel can be operated at speeds lower than that which would result from direct connection between a prime mover operating at idle speed and a propeller shaft.

11 Claims, 6 Drawing Sheets

MARINE REVERSE REDUCTION GEARBOX

BACKGROUND OF THE INVENTION

1. Field of the Invention

The present invention relates generally to a transmission for a marine vessel and, more particularly, to a marine reverse reduction gearbox which incorporates one or more variably engageable clutches, or slippable clutches, for variably transmitting torque between a prime mover and a propeller shaft of a marine vessel.

2. Description of the Prior Art

Marine reduction gearbox assemblies are used to transmit torque between a unidirectional prime mover and the propeller shaft of the marine vessel to provide bidirectional rotation capability for the propeller in association with the unidirectional prime mover. The rotational speed of the propeller shaft and the direction of the propeller shaft in a marine vessel are typically controlled by regulating the rotational speed of the prime mover in cooperation with engagement and disengagement of one or more clutches connected in torque transmitting association between the prime mover and the propeller shaft. Typically, an input shaft of a marine reduction gearbox is connectible to the prime mover and is also connected to forward and reverse transfer gears. These transfer gears continually rotate in opposite directions during operation and are driven by the prime mover. The forward and reverse transfer gears are connected, through clutches, to forward and reverse drive shafts which are, in turn, associated with individual pinion gears. The pinion gears are connected in torque transmitting association with the propeller shaft. By selectively engaging and disengaging the clutches associated with the forward and reverse transfer gears, the rotational direction of the propeller shaft can be controlled. In addition, the rotational speed of the propeller shaft can be controlled by regulating the rotational speed of the prime mover. This and many other torque transmitting techniques are known to those skilled in the art.

U.S. Pat. No. 4,451,238, which issued to Arnold on May 29, 1984, discloses a shaft brake for a marine propulsion system for a water craft. The propulsion system comprises a relatively large engine, or prime mover, and a power transmission which includes an output shaft for driving the propeller. The transmission includes forward and reverse shafts, gear trains between the forward and reverse shafts and the output shaft and clutches for the forward and reverse shafts. A shaft brake is provided to stop rotation of the output shaft for the propeller which minimizes damaging shocks to the propulsion system which sometime occur during maneuvering operations. The brake described in this patent is located concentrically with the forward shaft of the power transmission and is effective to brake the propeller shaft through interconnecting gears when both clutches are disengaged.

U.S. Pat. No. 4,458,799, which issued to Schueller on July 10, 1984, describes a marine propulsion control system that includes a maneuvering brake. The system disclosed is for air actuated ahead and astern clutches, an engine speed governor and a propeller shaft brake. The control is actuated by a throttle lever which is moved from a neutral position to select a direction of travel. The degree of movement of the throttle lever from neutral is representative of the desired speed in the selected direction. The control described in this patent engages the brake when the throttle lever is moved from an ahead to an astern direction at medium or high forward speeds. When this type of change is commanded, a pair of serially connected brake valves are piloted to connect the brake to a source of air under pressure. One of the brake valves is piloted by an accumulated speed pressure signal indicating an ahead speed greater than a predetermined minimum and the other valve is piloted by the throttle signal commanding astern direction. The brake disengages either when the accumulated pressure signal exhausts to a level below that necessary to pilot the first brake valve or when the pressure within the astern clutch rises to a preselected level.

U.S. Pat. No. 2,749,776, which issued to Fischer et al on June 12, 1956, discloses a reversing gear and a drive control that is particularly adapted for use with a marine propulsion unit. It utilizes a simplified gear arrangement in combination with clutches that control the direction in which power is transmitted. A brake is associated with the gearing in order to transmit power and to help absorb the energy of reversal upon reversal of direction of torque.

U.S. Pat. No. 4,305,710, which issued to Schneider on Dec. 15, 1981, discloses a ship propulsion transmission which has a torque converter for driving a fixed pitched propeller in the reverse direction. The transmission includes a prime mover such as a gas turbine engine or a diesel engine. It also provides a disengageable clutch between the prime mover and the propeller for the purpose of transmitting power to the propeller for driving it in a forward direction. The transmission also includes a hydraulic torque converter of the single stage, fixed housing type and which is connected between the prime mover and the propeller for driving the propeller in the reverse direction when the disengageable clutch is inoperative.

U.S. Pat. No. 4,316,722, which issued to Aschauer on Feb. 23, 1982, discloses a propulsion system for a submarine which comprises a low noise level, rapidly reversible propulsion system having a non-reversible adjustable speed prime mover, a reversible drive mechanism driven by the prime mover and a fluid-cooled torque converter and speed reduction apparatus.

U.S. Pat. No. 3,543,891, which issued to Mathers on Dec. 1, 1970, discloses a control system for engine, brake and forward-reverse clutches. It specifically describes the sequence of clutch, throttle and output shaft brake application in a propulsion system for a crash reversal condition imposed on the system. It automatically disengages the clutch assembly upon receipt of a crash reversal command signal and holds the assembly in neutral for a specific delay period before reengagement in the opposite directional mode. The control mechanism is pneumatically operated and responsive to pneumatic signals transmitted from a single lever master control.

U.S. Pat. No. 4,384,639, which issued to Collin on May 24, 1983, describes a two-way power transferring reduction gear of the epicyclic type. It includes two sun wheels, two sets of planetary gear wheels, two planetary gear wheel carriers and two external ring wheels. In addition, it also provides a means for selectively braking a first combination of one planetary gear wheel carrier and one of the external gear wheels, as well as the combination of the other external ring wheel and one of the sun wheels, respectively.

U.S. Pat. No. 3,363,732, which issued to Nakamura et al on Jan. 16, 1968, discloses a forward and reverse transmission with a brake for a prime mover. This device includes a unidirectional prime mover such as a turbine which provides a given driving force in a given direction. A transmission is connected between the prime mover and an output shaft which is connected to the load. A rearward transmission is also connected between the forward transmission and the output shaft for reversing the direction in which the latter is driven while still taking the drive in the same direction from the unidirectional prime mover.

U.S. Pat. No. 4,051,679, which issued to Collin on Oct. 4, 1977, discloses a marine propulsion plant with reversible propeller shaft connected thereto. It describes a suitable selection of the means for engaging the parts of the reversing gear in their respective working positions for both ahead and astern running, respectively. It also makes it possible to disengage the turbine part of the gear, to brake that turbine part and then to reengage the gear parts in their new relative positions.

U.S. Pat. No. 4,252,034, which issued to DeBruyne on Feb. 24, 1981, describes a free-floating planetary transmission with a reversible output. The planetary transmission is provided with free-floating compound planetary gear elements in which two of the planet gears of each planetary element mesh with a pair of gears coaxial with the transmission axis. The transmission also includes selectively operable clutch and brake means for connecting either of said pair of coaxial gears to the transmission output while the other of said pair of gears is connected to a fixed structure thereby providing the transmission with a reversible output.

U.S. Pat. No. 4,338,525, which issued to Kilgore on July 6, 1982, discloses a marine propulsion system that includes a gas turbine, an alternating current generator, a fixed pitch propeller, a synchronous motor and a frequency converter. The frequency converted is connected electrically between the generator and motor during starting and reversal procedures when the motor would normally have to operate as an induction motor. Means are also provided to brake the system dynamically to speeds within the capacity of the frequency converter. At speeds within the frequency converter's design capacity, the motor can be operated synchronously while it is running at a speed below the minimum operating speed of the turbine and generator.

Many different types of marine transmissions, or reverse reduction gear boxes, are available to perform the functions described above. However, when certain types of prime movers, such as engines with a high brake mean effective pressure, or BMEP, certain problems are encountered when attempting to perform crash reversal procedures. Although high BMEP engines provide certain significant advantages, such as a high horsepower to weight ratio, they exhibit a torque/RPM characteristic which is disadvantageous when the need arises to rapidly engage the engine to the propeller shaft when the engine is operating at a low rotational speed and the propeller is experiencing significant windmill forces due to the forward movement of the marine vessel through the water. These are precisely the circumstances encountered by a marine reduction gear box when a crash reversal from full ahead to full astern is commanded. These problems are typically solved by incorporating a controllable pitch propeller in the marine vessel. By specifying a controllable pitch propeller, stalling of the prime mover can possibly be avoided during crash reversal operations by having the engine constantly under a partial load. However, this solution to the problem requires additional capital cost and a more expensive propulsion system than would otherwise be required. Therefore, a significant benefit could be achieved if a means were provided to avoid stalling of high BMEP engines during crash reversal operations without having to specify a controllable pitch propeller.

SUMMARY OF THE INVENTION

The present invention relates generally to a marine reduction gearbox and, more particularly, to a gear assembly that is particularly intended for use with a high brake mean effective pressure engine. The gearbox of the present invention comprises a means for connecting the marine reduction gearbox in torque transmitting association with a prime mover. This connecting means typically includes an input shaft connected to the unidirectional prime mover, such as a diesel engine. The gearbox of the present invention also comprises a means for connecting the marine reduction gearbox in torque transmitting association with a shaft of a marine propeller. In addition, the present invention comprises a means for variably transmitting torque between the input shaft and the propeller shaft. In a preferred embodiment of the present invention, the variable torque transmitting means comprises a variably engageable clutch.

It is important to understand that, while most types of clutches known to those skilled in the art exhibit some slight degree of slippage during engagement or disengagement, they are not intended to operate for an extended duration in a slip mode. In other words, most known clutches require some finite period of time to move from a completely disengaged state to a completely engaged state or vice versa. During this transition from disengagement to engagement, the rotating portions of the clutch move from a non-contact relation with other components of the clutch to a contact relation with those components. It is during this finite period of time that some slippage can occur between rotating and non-rotating components. The present invention, on the other hand, incorporates variably engageable clutches which are specifically designed for use in a slipping mode for predetermined periods of time without significant damage occurring to the clutches. For purposes of this description, the term "variable engageable clutch" shall mean a clutch of the type which is designed and intended for use in a manner which disposes various clutch plates of the clutch in a slipping association with other clutch plates. In addition, this definition shall be used to refer to a clutch which is intended to operate for a predetermined period of time in a condition which is partially engaged. In other words, the clutch is intended to operate for a preselected period of time between a state of complete disengagement and one of complete engagement. This type of clutch can operate, for extended periods of time, with the prime mover operating at a speed slightly higher than its idle speed and with the propeller shaft operating at a percentage of its maximum rotational speed less than the percentage of the maximum rotational speed at which the engine, or other prime mover, is operating. More specifically, this type of clutch can be hypothetically operated in a slip mode between a prime mover and a propeller in which the prime mover is operating at a speed greater than its idle speed, which is usually about 35% of its maximum operational speed while the propeller is operating at approximately 20% of its maximum operational speed due to the slippage occurring within the clutch plates of the variably engageable clutch. In other words, if the engine idle speed is approximately 35% of its maximum speed, the present invention permits the propeller shaft to be driven at a speed below its idle speed while the engine is running at a speed above its idle speed, such as 40% or more of its idle speed. By permitting the propeller to be driven at this relatively low speed while the engine is being operated above its idle speed, the marine vessel can be maneuvered at slow speeds while certain deleterious conditions relating to tooth separation, which will be discussed below, can be avoided by increasing the engine speed above its idle speed.

Therefore, while the present invention is described below as incorporating a variable clutch or, alternatively, a variably engageable clutch, these terms should be understood to exclude known clutches that exhibit some minor degree of slippage during the brief period of time from which they are switched from complete disengagement to complete engagement or, alternatively, from complete engagement to complete disengagement. In those known types of clutches, this minor slippage is incidental and unavoidable whereas, in the variably engageable clutch of the present invention, the slippage is intentional for purposes of partially transmitting torque from the prime mover to the load, such as a propeller shaft while absorbing the remaining torque which is not transmitted from the prime mover to the propeller shaft. In addition, as will be discussed in greater detail below, the present invention permits the engine to be partially connected to the propeller shaft while the brake is engaged to inhibit rotation of the propeller shaft. This places the engine, or prime mover, under a load prior to the release of the brake.

In a preferred embodiment of the present invention, the marine reduction gearbox comprises an input shaft that is connectible in torque transmitting relation with an engine. It also comprises an ahead transfer gear and an astern transfer gear which are connected in tooth mesh relation with each other. The ahead transfer gear is connected in torque transmitting relation with the input shaft of the gearbox. The gearbox also comprises a forward shaft and a reverse shaft which are connected with their respective transfer gears. A forward pinion gear is provided and connected in torque transmitting relation with the forward shaft while a reverse pinion gear is connected in torque transmitting relation with the reverse shaft. A bull gear is connected in tooth mesh relation with both the forward and reverse pinion gears. A propeller shaft is connected to the bull gear and a brake is connected in rotation inhibiting relation with the bull gear. In a most preferred embodiment of the present invention, the brake is connected in rotation inhibiting relation with the reverse shaft and reverse pinion gear and is associated in coaxial relationship with those components. The brake is attached in rotation inhibiting relation with the reverse shaft, in a preferred embodiment of the present invention for a specific reason. If vibratory torque exists in the system, the slight drag provided by the brake in addition to the slight drag provided by the astern clutch, even when both the brake and the astern clutch are fully disengaged, provide a dampening effect which reduces the noise and stresses that could otherwise result from the vibratory torque while the marine vessel is operated in the ahead direction which is its most common mode of operation. However, it should be understood, that since both the forward and reverse pinion gears are connected in torque transmitting relation with a common bull gear, braking of the reverse shaft will also result in the braking in the forward shaft and of the propeller shaft.

BRIEF DESCRIPTION OF THE DRAWING

The present invention will be more fully understood from a reading of the description of the preferred embodiment in conjunction with the drawing, in which.

DESCRIPTION OF THE PREFERRED EMBODIMENT

Figure 1:
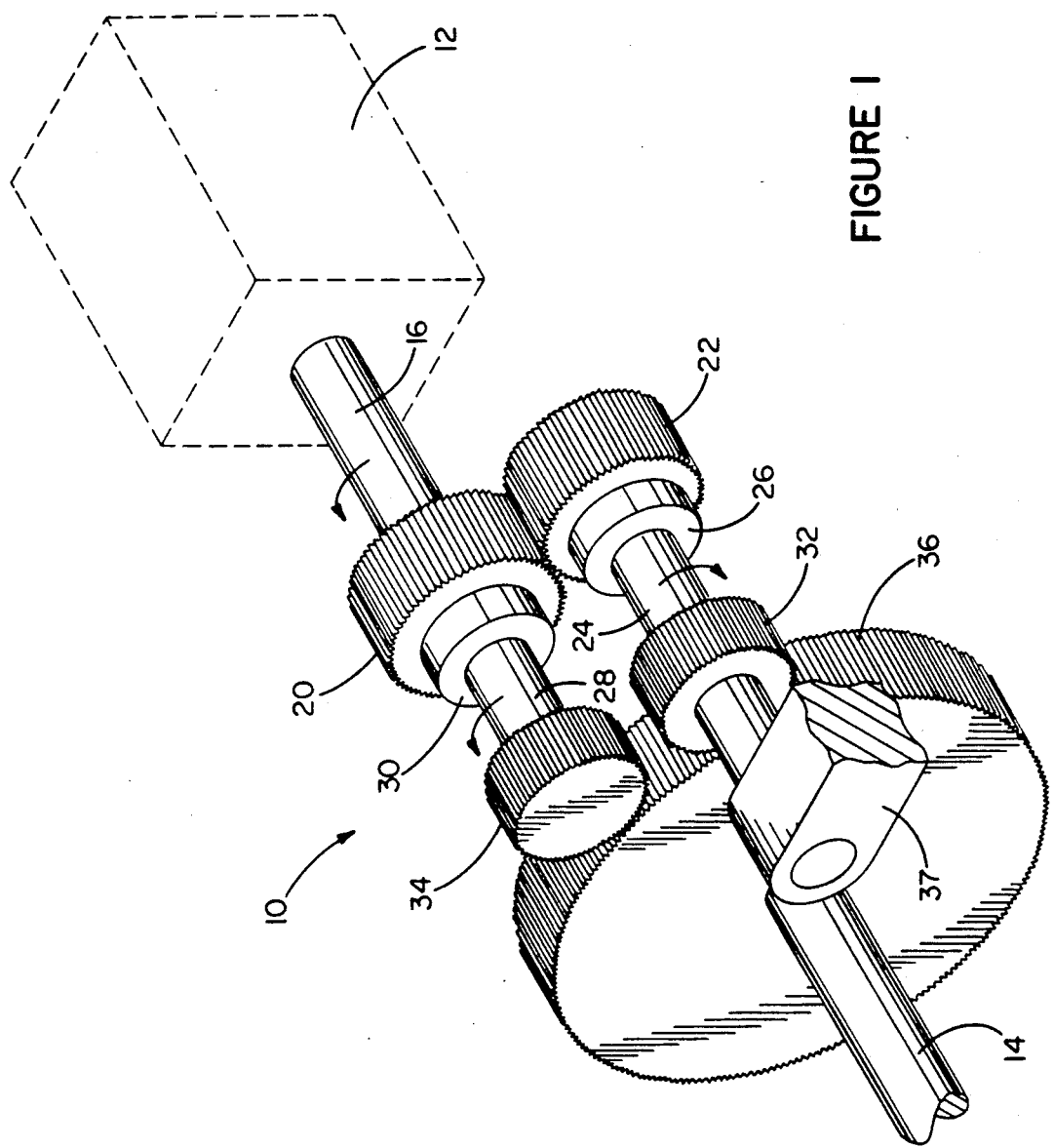
FIG. 1 illustrates a schematic representation of a gearbox incorporating the concepts of the present invention.

Throughout the description of the preferred embodiment, like components will be identified by like reference numerals.

FIG. 1 shows a schematic illustration of the present invention connected in torque transmitting relation between a prime mover and a propeller shaft. It should be understood that, for purposes of clarity, FIG. 1 does not illustrate the housing structure or the support bearings for the various rotational components. It should further be understood, however, that the rotational components in FIG. 1 are intended to be supported with bearings and housing structures that are well known to those skilled in the art.

Reference numeral 10 in FIG. 1 is used to identify the combination of components included in the reverse reduction gearbox of the present invention. As can be seen, the gearbox 10 is connected in torque transmitting association between a prime mover 12 and a propeller shaft 14. The prime mover 12 can be a unidirectional diesel engine and, more appropriately, a high brake mean effective pressure, or BMEP, engine. An input shaft 16 is connectible in torque transmitting association with the prime mover 12. A forward, or ahead, transfer gear 20 and a reverse, or astern, transfer gear 22 are associated in torque transmitting relation with the input shaft 16. The forward and reverse transfer gears, 20 and 22, are connected in tooth mesh relation with each other and, therefore, rotate in opposite directions relative to each other. The reverse transfer gear 22 is connected to a reverse drive shaft 24 through a variably engageable clutch 26. The forward transfer gear 20 is connected in torque transmitting association with a forward drive shaft 28 through a variable engageable clutch 30.

The reverse drive shaft 24 is connected to a reverse pinion gear 32 and the forward drive shaft 28 is connected to a forward pinion gear 34. As can be seen in FIG. 1, both the reverse pinion gear 32 and the forward pinion gear 34 are connected in tooth mesh relation with a bull gear 36. The reverse pinion gear 32 and the forward pinion gear 34 are not connected in tooth mesh relation with each other. The bull gear 36 is connected in torque transmitting relation with the propeller shaft 14.

During normal operation of the gearbox, the propeller shaft 14 can be operated in either the forward or reverse direction. During normal ahead running, the variably engageable clutch 30 is fully engaged and the variably engageable clutch 26 is fully disengaged. In this manner, torque is transmitted from the prime mover 12 through the input shaft 16 and forward transfer gear 20 to the forward drive shaft 28 and forward pinion gear 34. This causes the bull gear 36 and propeller shaft 14 to rotate in a direction which results in the forward propulsion of the marine vessel. During operation in a reverse direction, the variably engageable clutch 26 is fully engaged and the variably engageable clutch 30 is fully disengaged. This transfers torque from the prime mover 12 through the input shaft 16 to the reverse transfer gear 22. Torque is further transmitted through the fully engaged variably engageable clutch 26 to the reverse drive shaft 24, the reverse pinion gear 32, the bull gear 36 and the propeller shaft 14. Through this connection, the bull gear 36 and the propeller shaft 14 are caused to rotate in a direction which causes the propeller shaft to move in a reverse or astern direction.

A hydraulic disc brake 37 is connected in rotation inhibiting relation with the reverse drive shaft 24 in a preferred embodiment of the present invention for the reasons described above, relating to vibrating torque. The brake 37 could alternatively be connected to the forward shaft 28. However, in the preferred embodiment of the present invention the brake 37, the reverse pinion gear 32, the reverse drive shaft 24 and the reverse transfer gear 22 are all arranged coaxially with each other. The brake 37 is attached to a suitable stationary member, such as the housing of the gearbox 10.

It should be understood that known marine vessel transmissions, or gearboxes, incorporate transfer gears, forward and reverse drive shafts, ahead and reverse pinion gears, bull gears, brakes and propeller shafts. However, known gearboxes incorporate clutches, connected in torque transmitting relation between the transfer gears and their respective drive shafts, which can only be operated in either a fully engaged or fully disengaged mode for extended periods of time. Therefore, in known marine vessel transmissions, any slippage that may occur between the transfer gears and their respective drive shafts only occurs temporarily during the change in status from complete disengagement to complete engagement or, vice versa. In addition, prior art gearboxes do not employ clutches that can be operated in a partially engaged mode while the brake is fully engaged.

Figure 2:
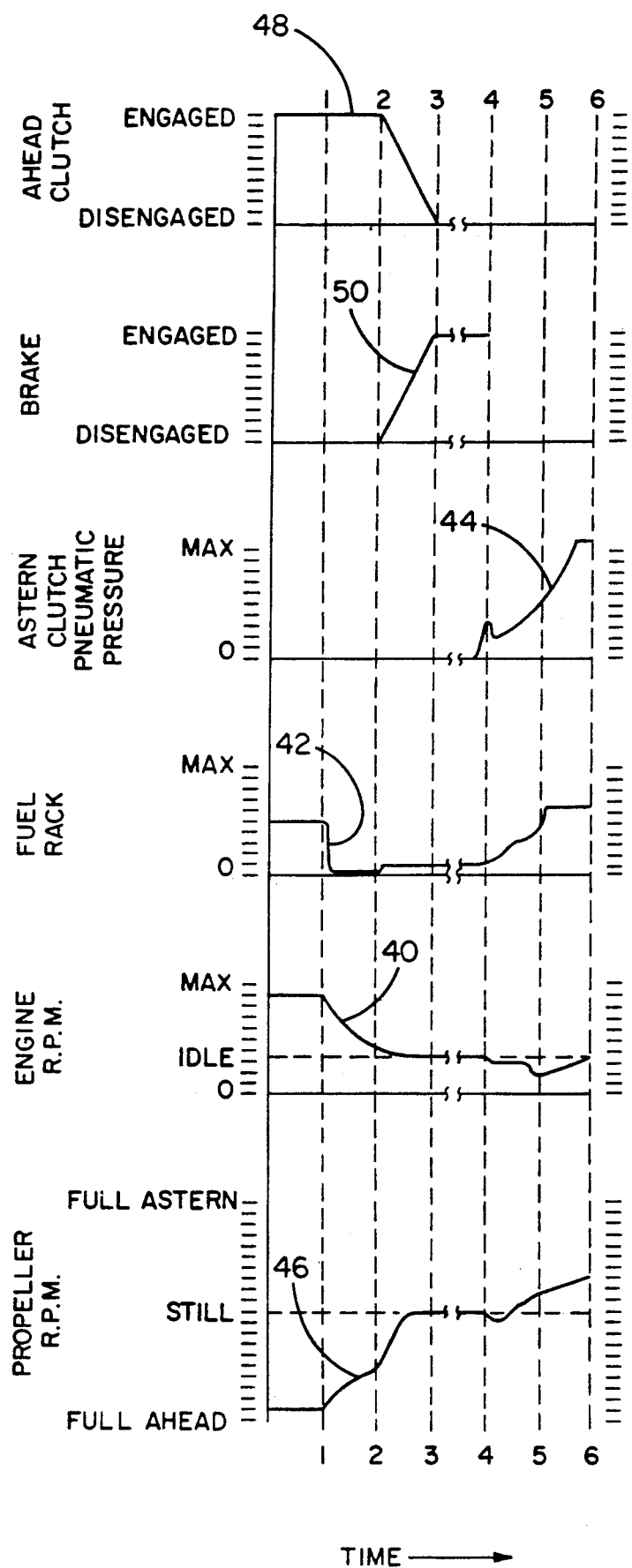
FIG. 2 shows a chronological representation of a crash reversal process according to techniques that are known in the prior art.

To more fully understand the significant distinctions between the present invention and the prior art and to more fully appreciate the advantages provided by the present invention, a crash reversal operation will be described as it would occur in a vessel incorporating a prior art gearbox that does not include clutches which can be caused to slip or be operated in a partially engaged state for an extended duration. FIG. 2 illustrates a chronology that has been empirically determined from tests run with a prior art gearbox which does not incorporate variably engageable clutches. The vertical axes in FIG. 2 are intended to represent percentages of full speed or full engagements rather than specific magnitudes. As can be seen in FIG. 2, prior to event number 1 the engine is running at a preselected RPM 40 which, in this empirical case, is essentially full speed ahead. Furthermore, the fuel rack 42 is at a constant position and the astern clutch 44 is completely disengaged. The ahead clutch 48 is completely engaged prior to event 1 and the propeller speed 46 is operating in an ahead direction corresponding proportionally to the engine RPM 40. At event number 1, a crash reversal command is sent to the control system. The engine is immediately commanded to its idle speed and, between event number 1 and event number 2, the resulting deceleration of the engine rotational speed 40 can be seen. This decrease in engine speed 40, with the ahead clutch 48 fully engaged, results in a proportional decrease in propeller RPM 46 as indicated between event number 1 and event number 2. After a predetermined time delay which is a function of the specific marine vessel design and is initially determined during sea trials the brake is commanded to be fully engaged to further slow the propeller shaft 46 and the ahead clutch is commanded to be disengaged. This occurs between event number 2 and event number 3. As a result of the engagement of the brake 50, the propeller decelerates to a still condition, immediately prior to event number 3. In addition, the engine achieves its idle speed approximately midway between events 2 and 3 as a result of its complete disengagement from the propeller. The time span between event number 3 and event number 4 will vary significantly from one application to another and, therefore, is indicated by a broken series of lines for all of the variable conditions illustrated in FIG. 2. However, it should be understood that between event number 3 and event number 4 the engine speed 40 is at its idle RPM and the fuel rack 42 is constant at a position to achieve that idle RPM of the engine. The astern clutch 44 is fully disengaged, the propeller 46 is still and held by the brake 50 which is fully engaged. The ahead clutch 48 is fully disengaged.

Beginning immediately prior to event number 4, the astern clutch 44 is commanded to be engaged. The line in FIG. 2 identified by reference numeral 44 represents the pneumatic pressure provided to the astern clutch. It is very important to note that the empirical information illustrated in FIG. 2 relates to a specific gearbox that included a pneumatic clutch. Therefore, while the pneumatic pressure represented by line 44 shows a decrease immediately after event number 4, this pressure decrease does not represent a decrease in clutch pressure, or slippage. Instead, it should be clearly understood that the astern clutch experiences a constant increase in engagement between a time immediately prior to event number 4 and the occurrence of event number 5. In addition, it should be understood that the astern clutch achieves a fully engaged status before the pneumatic pressure achieves its maximum magnitude after event number 5. It is also important to note that, immediately after event number 4, as the astern clutch begins to move from disengagement to engagement and the brake is released, the propeller 46 experiences a temporary return to forward rotation because of the windmilling effect caused by the forward motion of the marine vessel through the water and the disengagement of the brake 50. This temporary return to forward rotation by the propeller shaft causes the engine to experience a reduction in RPM 40, as can be seen in FIG. 2 by the lowering of the RPM from the idle magnitude that exists between events 3 and 4. When the astern clutch increases its degree of engagement, with the brake released, the engine RPM drops further as the time approaches event number 5. Eventually, the astern clutch is fully engaged, prior to event number 5, and the engine RPM matches the propeller RPM, as a percentage of their respective maximum speeds.

The exemplary chronology shown in FIG. 2 is empirical and determined from an actual sea trial, but does not represent the precise values that would have occurred if the engine in question had been a high brake mean effective pressure, or BMEP, engine. If the engine represented in FIG. 2 was a high brake mean effective pressure engine, the reduction in engine RPM experienced between event number 4 and event number 5 would be much more extreme and would likely result in the actual stalling of the engine if the astern clutch and brake were operated as shown in FIG. 2. In other words, the virtually simultaneous operation of the initial astern clutch engagement command and the brake disengagement command, at event number 4, rapidly places the engine in a condition where it must attempt to increase the speed of the propeller shaft from still to reverse at a time immediately after the engine is operating at its idle speed with no load, such as that time illustrated between event number 3 and event number 4. This sudden connection of the engine to the propeller shaft, while at idle RPM, could likely cause a high BMEP engine to stall or rotate in the opposite direction. The present invention is directed toward solving this problem.

Figure 3:
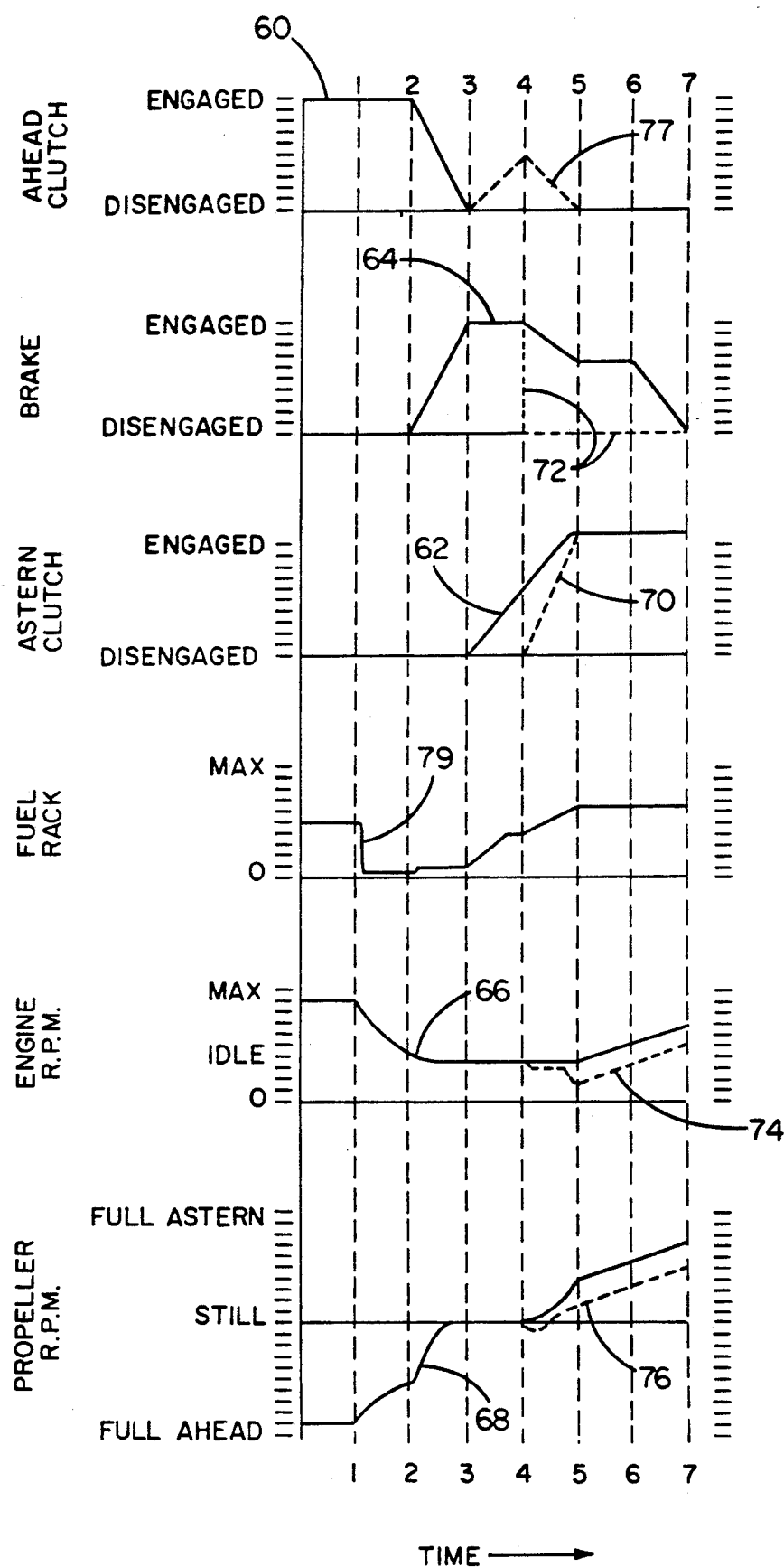
FIG. 3 shows a chronological representation of the steps incorporated in a crash reversal through the use of the present invention.

FIG. 3 illustrates a hypothetical chronology of operations for the ahead clutch, astern clutch, brake and engine RPM for a marine reduction gearbox made in accordance with the present invention. In FIG. 3, line 60 represents the state of engagement or disengagement of the ahead clutch, line 62 represents the state of engagement or disengagement for the astern clutch, line 64 represents the status of the brake and line 66 represents the RPM of the engine. Line 68 illustrates the RPM of the propeller shaft. In FIG. 3, dashed lines are used to represent the corresponding magnitudes that would have occurred if the same procedures were performed using a gearbox made in accordance with the prior art instead of the present invention. It should be understood that the solid lines in FIG. 3 are theoretical in nature, but represent the expected results if a gearbox made in accordance with the present invention is used in the manner described below. Dashed line 70 represents the activation of the astern clutch as would be expected in prior art gearboxes and dashed line 72 represents the activation of the brake in that same circumstance. It should be very clearly understood that, while line 44 in FIG. 2 represents the pneumatic actuation pressure used to activate the astern clutch, line 70 of FIG. 3 represents the actual degree of engagement of the astern clutch plates. In other words, line 44 in FIG. 2 and line 70 in FIG. 3 do not represent the same value and are not directly comparable to each other. Instead, the pneumatic pressure 44 results in the clutch engagement characteristic illustrated by line 70. Therefore, line 70 represents the characteristic operation of the prior art clutch that is most suitably compared to line 62 which represents the operation of the astern clutch of the present invention. It is important to note that the engagement of the astern clutch does not occur simultaneously with the engagement of the brake in the operation illustrated for the known gearbox which does not incorporate the present invention. Dashed line 74 represents the engine RPM that would result from operation of prior art gearboxes and dashed line 76 represents the propeller speed of the prior art device under that same circumstance.

With continued reference to FIG. 3, it should be noted that the astern clutch can be operated for a preselected period of time in the slip mode between full disengagement and full engagement. This type of clutch comprises a plurality of clutch plates, or discs, and is generally known to those skilled in the art for use in applications other than in marine reverse reduction gearboxes. Clutches of this type are available in commercial quantities from the Industrial Clutch Corporation which has a place of business in Waukesha, Wis. This is represented by the slope of line 62 between event number 3 and event number 5. It should be clearly understood that the slope of line 62 is not meant to be representative of any preferred length of time but, instead, is used to indicate the compatibility of a variably engageable clutch with this type of procedure. The specific shape of line 62 between event number 3 and event number 5 is a function of the control system and the specific characteristics of the marine vessel on which the present invention is installed. In addition, the overlap of the astern clutch engagement and the brake engagement can be varied depending on the specific application.

Immediately after the brake is sensed as being fully engaged, and the propeller is still, the astern clutch can be activated to a slip mode in accordance with the present invention. As the marine vessel is slowing in its forward speed through the water, the astern clutch is placed in a slip mode, as shown between events 3 and 4, while the brake is engaged so that the engine is partially loaded as it attempts to drive a fully braked propeller shaft through the variably engageable clutch. This creates a load on the engine that causes the fuel rack to increase the power output of the engine even though the propeller is inhibited by the brake from rotating. The fuel rack automatically operates to maintain the RPM at the idle speed of the engine which would otherwise be reduced as a result of the load provided by the partial engagement of the astern clutch. This increase in power output by the engine prepares it for its subsequent connection to the propeller shaft with the brake disengaged. The purpose of this partial engagement of the astern clutch, during the time when the propeller shaft is still and under the effect of the brake, is to avoid the condition, shown immediately after event number 4 in FIG. 2, where the engine is in an unloaded condition at idle speed and suddenly commanded to drive the propeller shaft in a direction opposite to that in which it is being induced by the forward motion of the marine vessel through the water. As a result, as illustrated in line 66 in FIG. 3, the engine RPM does not experience a reduction between event number 4 and event number 5 as occurs in the prior art device which is illustrated by dashed line 74. Furthermore, because of the operation of the present invention, the propeller does not experience the windmilling effect which is illustrated immediately after event number 4 by dashed line 76. It should therefore be understood that the present invention, with its variably engageable clutch, permits the engine to be partially connected in torque transmitting relation to a fully braked and completely still propeller shaft immediately after the brake is completely engaged during a crash reversal procedure. This partial connection between the prime mover and the still propeller shaft, with the engine speed commanded to the idle setting, causes the fuel rack 79 to increase the fuel flow to the engine to maintain the idle speed of the engine under partial load. Even though the propeller shaft is not being driven by the engine under these conditions, the power output of the engine is significantly increased to overcome the partial loading that is provided by the variable engagement of the slipping astern clutch. This increased power output prepares the engine for the subsequent connection to an unbraked propeller shaft with increased engagement of the variably engageable clutch as the command is sent to the engine to increase RPM and cause the propeller shaft to rotate at increasing speeds in a reverse direction even though the vessel is still proceeding in a forward direction through the water. This creates sufficient power output from the prime mover to overcome the windmilling effect caused by that forward movement of the vessel through the water.

In an alternate embodiment of the present invention, the ahead clutch can also be partially engaged, as indicated by dashed line 77. This optional partial engagement of the ahead clutch 30 can be used to provide additional load that is reflected back to the prime mover 12.

Figure 4:
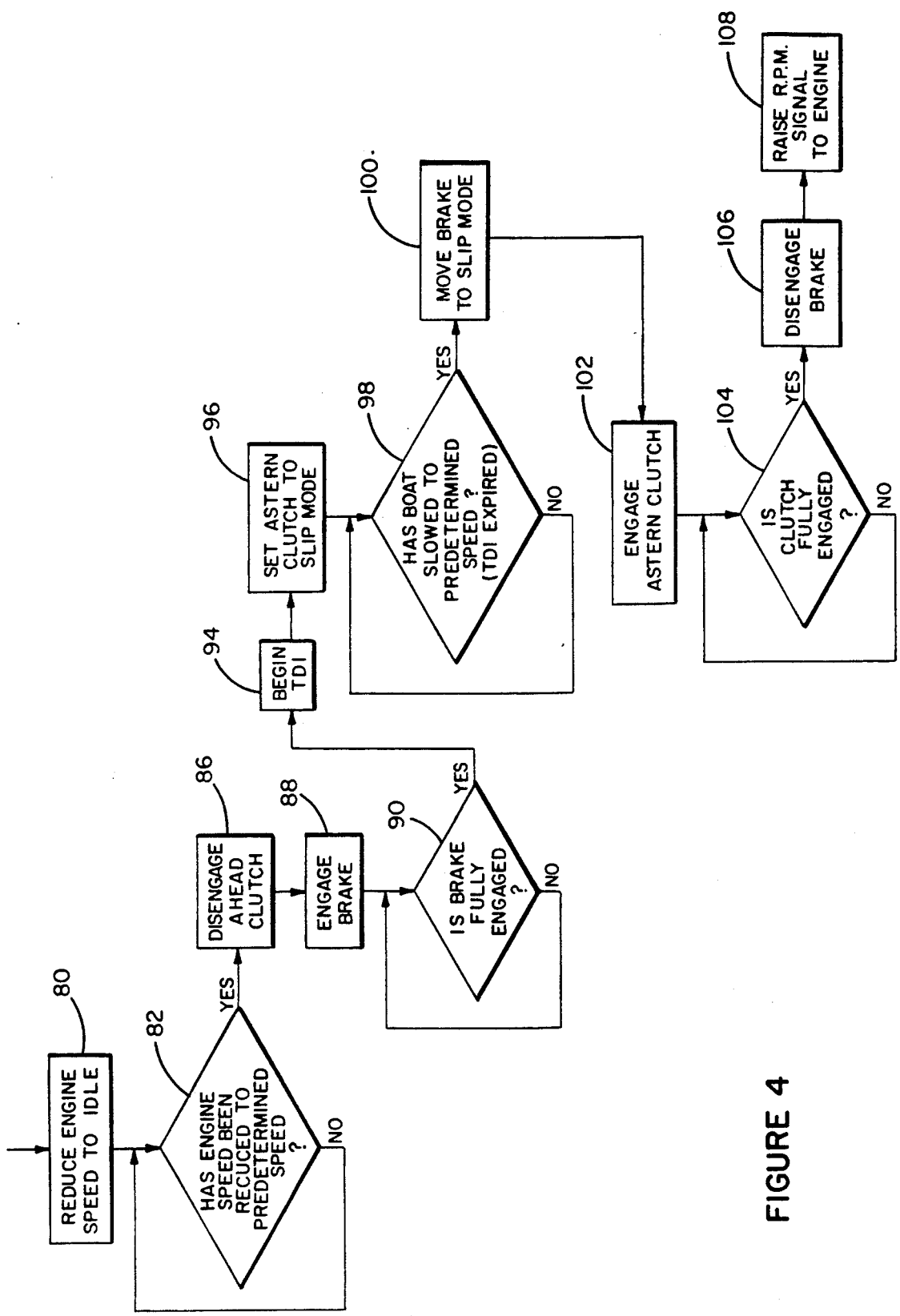
FIG. 4 shows a flow chart of a representative control scheme utilizing the present invention during a crash reversal procedure.

In FIG. 4, an illustrative flow chart is shown which could be incorporated in a marine vessel control system utilizing the present system. It should be emphasized, however, that the flow chart of FIG. 4 is hypothetical and could be significantly altered while remaining within the scope of the present invention. The sequence represented by the flow chart in FIG. 4 begins, prior to functional block 80, immediately after a crash reversal command is sensed by the control system from the operator of a marine vessel. It is presumed that, at the time this signal is sensed, the marine vessel is proceeding at a forward speed roughly equal to the vessel's maximum forward speed and an immediate crash reversal is required to stop the vessel as soon as possible.

The control system immediately commands the engine to reduce its speed to its idle speed, as shown by functional block 80. The control system then continually monitors the engine speed to determine whether or not it has reached a predetermined reduced speed less than maximum RPM, but grater than its idle speed. This is indicated by functional block 82. The predetermined speed referred to in functional block 82 represents a speed at which the brake of the gearbox can be safely applied to further inhibit the rotation of the propeller shaft. This speed of the engine will vary for different applications. It should be understood that a fixed time delay could also be used to determine the proper time to engage the brake. During sea trials, the appropriate time delay could be determined and used instead of measuring the RPM of the engine as indicated by block 82 in FIG. 4. When this proper rotational speed or appropriate time delay passage is sensed by the control system, the ahead clutch is disengaged, as indicated by functional block 86, and the brake is engaged as indicated by functional block 88.

After the brake is commanded to be engaged at functional block 88, the control system monitors the brake to determine when it is fully engaged. This is represented by functional block 90. The brake is continually monitored until it is sensed as being fully engaged and, when that occurs, a fixed time delay is initiated. That time delay, as indicated by functional block 94, represents a known time which is initially predetermined during sea trials for the specific marine vessel in which the gearbox is installed. That time represents the required duration between the time when the propeller is still and the time when the vessel has slowed to a speed at which the prime mover can appropriately be connected to an unbraked propeller shaft for the purpose of causing the propeller shaft to begin to rotate in the reverse direction. This duration will vary from application to application. At the same time when the control system begins to monitor the duration which begins with functional block 94, the astern clutch is set to a slip mode as shown by functional block 96. The meaning of functional block 96 is that the variably engageable clutch of the present invention is partially engaged so that torque is partially transmitted between the prime mover and the propeller shaft which is completely still and inhibited from rotation by the action of the brake which is fully engaged. The result of this partial engagement of the variably engageable clutch is that the prime mover is partially loaded while being commanded to maintain its idle RPM. This causes the fuel rack 79 of the control system to increase the fuel flow to the engine and, as a result, increase its power output to a magnitude greater than that which it would normally provide if the engine was not loaded but, instead, completely disconnected from both the forward and astern gears of the marine reduction gearbox as known in the prior art. Functional block 96 represents the most important characteristic of the present invention. It permits the control system to preload the prime mover while the propeller shaft remains inhibited from rotating by the brake and while the marine vessel is being slowed in its forward passage through the water. This increased power output of the engine is preparatory to the time when the engine will be connected to an unbraked propeller shaft for purposes of causing the propeller shaft to rotate in the reverse direction, against the significant windmilling forces of the water, and induce the marine vessel to slow at a more rapid pace in its forward passage through the water.

As indicated by functional block 98 in FIG. 4, the control system continually monitors the passage of time to determine whether or not the required time has elapsed to indicate that the marine vessel has slowed to an acceptable speed to engage the astern clutch with the brake disengaged. When the appropriate time has elapsed, the brake is moved to a slip mode and the astern clutch is more fully engaged, at a predetermined rate, from its slip mode, or partially engaged mode, to a fully engaged mode. These actions are represented by functional blocks 100 and 102. After the commands represented by functional blocks 100 and 102 are activated, the control system monitors the astern clutch to see if it is fully engaged. This is illustrated by functional block 104. When the astern clutch is fully engaged, the brake is fully disengaged and the rotational speed of the engine is commanded to increase. The disengagement of the brake is illustrated by functional block 106 and the operation by which the RPM of the engine is increased is represented by functional block 108. The remainder of the procedure is not shown in FIG. 4 because it will vary as a function of the particular marine vessel in which the present invention is incorporated and the reverse propeller speed required to halt the forward movement of the vessel.

The present invention provides another significant benefit beside that which is described above relating to a crash reversal procedure. That important secondary benefit relates to the operation of a marine vessel at a speed which is lower than the propeller speed associated with the idle speed of the prime mover. In other words, if the idle speed of a prime mover is hypothetically 35% of its maximum speed and the desired rotational speed of the propeller shaft is less than 35% of its maximum speed, significant difficulty is experienced in maintaining the desired speed of the vessel. Although this procedure can be accomplished by repeatedly engaging and disengaging the ahead clutch connecting the prime mover to the propeller shaft, this is sometimes a very difficult maneuver to perform and usually results in wide variations of speed from that which is desired.

Figure 5:
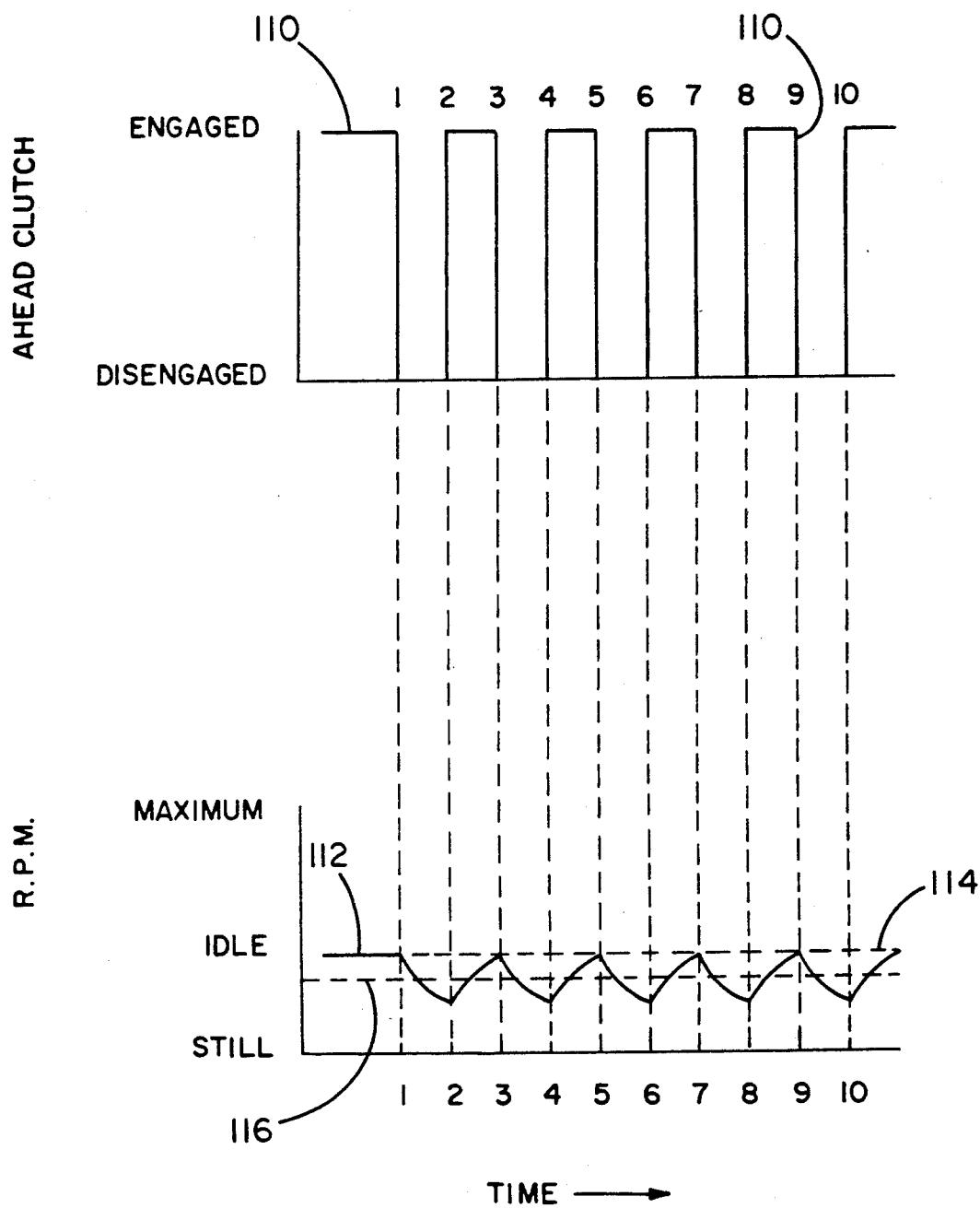
FIG. 5 shows a technique known in the prior art for operating a marine vessel at a speed below that which would result through direct connection to an engine operating at idle speed.

FIG. 5 illustrates the typical procedure required to perform this maneuver with known gearboxes made in accordance with the prior art. The status of the ahead clutch is illustrated by line 110 which repeatedly is alternated between fully engaged and fully disengaged. Line 112 represents the hypothetical propeller shaft speed. Dashed line 114 represents the idle speed of both the engine and the propeller while dashed line 116 represents a hypothetical desired rotational speed of the propeller. Prior to event number 1 in FIG. 5, the propeller speed matches the engine idle speed because of the complete engagement of the ahead clutch 110. When the ahead clutch is fully engaged, the propeller speed varies directly, as a percentage of its maximum speed, with the engine. Since the idle speed indicated by dashed line 114 is higher than the desired speed indicated by dashed line 116, the ahead clutch must be disengaged to slow the propeller speed. This is indicated by the period of disengagement between event number 1 and event number 2 in FIG. 5. During this time of disengagement, the propeller shaft is not connected in torque transmitting relation with the engine and, as a result, begins to slow from the idle speed toward a near still condition. As this rotational speed of the propeller falls below dashed line 116 and the marine vessel slows to a speed below that which is desired, the ahead clutch is reengaged as indicated by line 110 at event number 2. When the ahead clutch is fully engaged, between event number 2 and event number 3, the propeller shaft speed increases, as indicated by line 112, between these events. This full engagement of the ahead clutch is continued until the propeller speed exceeds that which is desired. Then, the ahead clutch is again disengaged. In order to achieve an average speed equal to that indicated by dashed line 116, the ahead clutch must be repeatedly engaged and disengaged in an attempt to maintain this average speed. As can be seen in FIG. 5, this procedure is difficult to perform and only results in an approximation of the desired speed.

Figure 6:
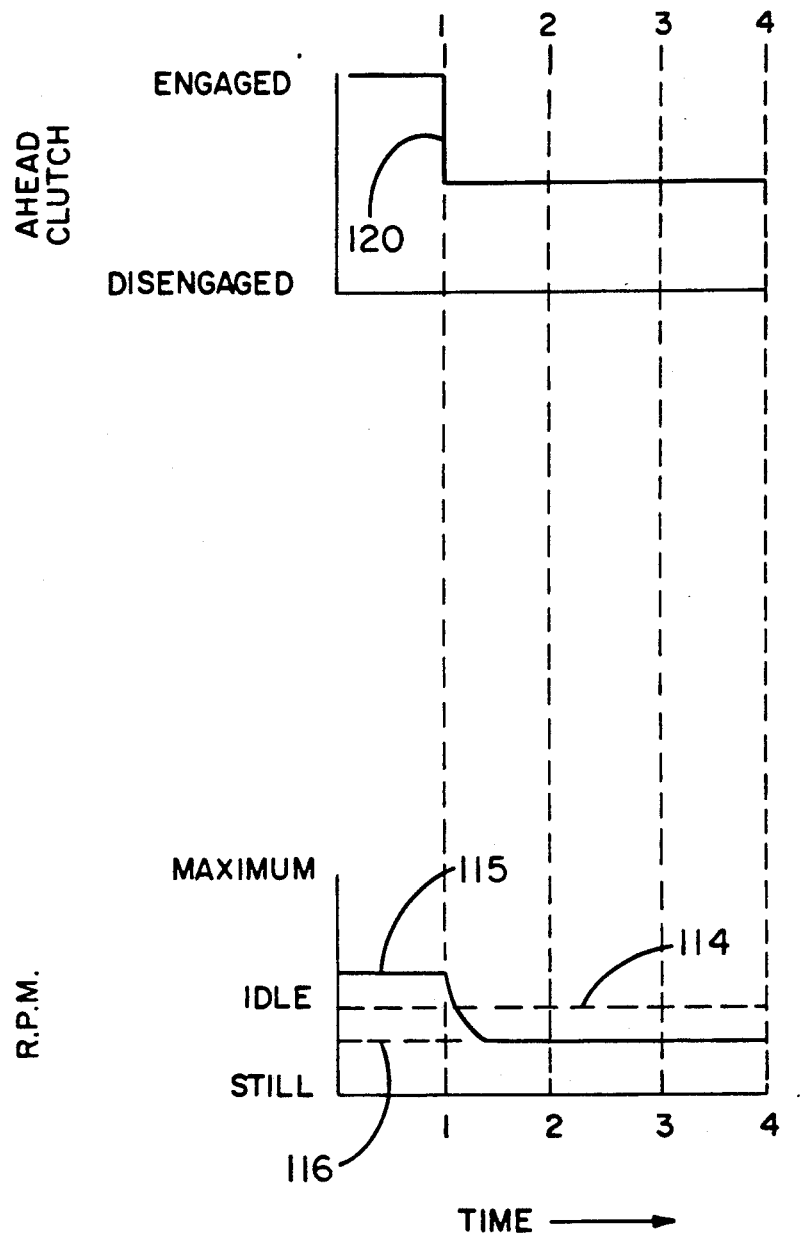
FIG. 6 shows a representation of a technique for operating a marine vessel at speeds below the idle RPM of its prime mover utilizing the concepts of the present invention.

With the provision of a variably engageable clutch associated with the ahead transfer gear and ahead drive shaft in a gearbox made in accordance with the present invention, the maneuver described above can be more simply and easily performed. This procedure is shown in FIG. 6. The ahead clutch, prior to event number 1 in FIG. 6, is fully engaged and the engine is set at a magnitude slightly higher than idle speed.

It should be clearly understood that although the maneuver illustrated in FIG. 6 can be performed with the engine speed set at its idle speed, the present invention also permits the maneuver to be performed with the engine speed set at a magnitude that is above its idle speed. This ability is significantly advantageous in certain applications where the back torque experienced by the propeller shaft could cause tooth separation within the gear train if the engine is set at its idle speed. This condition, which could lead to noisy operation and damage to the components of the gearbox, can be reduced or eliminated if the engine is operated at a magnitude above its idle speed. The status of the variably engageable clutch of the present invention is indicated by line 120 in FIG. 6. As in FIG. 5, dashed line 114 in FIG. 6 represents the propeller shaft speed equivalent to the engine idle RPM and dashed line 116 represents the desired rotational speed of the propeller shaft. Prior to event 1, the engine and propeller are running at a speed, indicated by line 115, above their idle speed. At event number 1, the ahead clutch is commanded to a partially engaged status equivalent to the percentage of the speed of the engine which is desired on the part of the propeller shaft. Once partially engaged at event number 1, the variably engageable clutch of the present invention is caused to remain at this partial torque transmitting level of engagement. The propeller speed drops from the engine speed to the desired rotational speed indicated by dashed line 116. This relationship continues through events numbered 2, 3 and 4. By definition, the variable engageable clutch is capable of partially transmitting torque from a prime mover to a load when the prime mover is operating at or above its idle speed.

In summary, the present invention provides a marine reduction gearbox, or transmission, that incorporates at least one variably engageable clutch connected in torque transmitting relation between a prime mover and a propeller shaft. The inclusion of this variably engageable clutch permits a control system to command the clutch to a partial torque transmitting position for a predetermined period of time. This configuration results in two significant benefits. First, during crash reversal procedures, the prime mover can be partially loaded while the propeller shaft is still and inhibited from rotating by the full engagement of a brake. This partial loading of the prime mover while the prime mover is commanded to maintain an idle speed, increases the fuel flow to the engine and the power output of the engine is increased while the idle speed is maintained. The result of this procedure is that the engine can be prepared for a future engagement to an unbraked propeller shaft with reduced risk of stalling the engine, especially in the case of a high basic mean effective pressure, or BMEP, engine such as those which are increasingly being specified for marine vessels. By preloading the prime mover with a partial load, the power output of the prime mover is increased and stalling of the prime mover is avoided when it is eventually connected in torque transmitting association with an unbraked propeller shaft. A second significant advantage of the present invention is that it permits the marine vessel to be operated at speeds which are less than those that would normally occur if the engine of the marine vessel is operated at idle speed and the propeller shaft is connected in full torque transmission relation with the engine. This second advantage removes the need for repeatedly engaging and disengaging a standard clutch to achieve an average speed equivalent to that which is desired.

As described in significant detail above, the primary difference between the present invention and marine reduction gearboxes made in accordance with the prior art is that the present invention provides one or more variably engageable clutches in torque transmitting relation between the prime mover and the propeller shaft. In one highly preferred embodiment of the present invention, adapted for a specific application, a variably engageable clutch of the type identified as an HC model, sized for the specific application and available from the Industrial Clutch Corporation is incorporated in a gearbox made in accordance with the present invention. Although most known clutches exhibit a small degree of slippage during transition from fully engaged to fully disengaged status, or vice versa, that minor slippage is inadvertent, whereas the variably engageable clutches of the present invention are provided so that torque can be intentionally partially transmitted, for a predetermined duration, between the prime mover and the propeller shaft. The advantage of this partial torque transmission is described in detail above.

Although the present invention has been described with significant detail and illustrated with considerable specificity, it should be understood that modifications of the preferred embodiment of the present are within its scope.

What I claim is:

1. A method for operating a marine reduction gear, comprising:
   connecting said marine reduction gear in torque transmitting relation with an engine;
   connecting said marine reduction gear in torque transmitting relation with a propeller shaft;
   variably transmitting torque in a first rotational direction between said first and second connecting means; and
   simultaneously inhibiting rotation of said propeller shaft.

2. A method for transmitting torque from a prime mover to a propeller shaft, comprising:
   connecting an input shaft of a marine reduction gear to an input of a variably engageable clutch;
   connecting an output of said variably engageable clutch in torque transmitting relation with said propeller shaft;
   providing a brake connected in rotation inhibiting relation with said propeller shaft;
   energizing said brake to prevent rotation of said propeller shaft; and
   partially energizing said variably engageable clutch to create a load on said prime mover while said brake remains at least partially energized.

3. The method of claim 2, further comprising:
   deenergizing said brake as said variably engageable clutch is further energized toward full engagement.

4. A method for transmitting torque from a prime mover to a propeller shaft, comprising:
   connecting an input shaft of a marine reduction gear to an input of a variably engageable clutch;
   connecting an output of said variably engageable clutch in torque transmitting relation with said propeller shaft;
   providing a brake connected in rotation inhibiting relation with said propeller shaft;
   deenergizing said brake; and partially energizing said variably engageable clutch.

5. A marine reduction gear, comprising:
   an input shaft, said input shaft being connectable in torque transmitting relation to a prime mover;
   an output shaft;
   means for variably transmitting torque between said prime mover and said output shaft, said torque transmitting means having an input member connected in torque transmitting relation with said input shaft and an output member connected in torque transmitting relation with said output shaft, said torque transmitting means being operable to permit slippage between said input and output members to occur continuously for a predetermined period of time;
   said torque transmitting means comprising a transfer gear connected in torque transmitting relation with both said input shaft and said input member;
   said torque transmitting means comprising a drive shaft connected to said output member, a pinion gear connected to said drive shaft and a bull gear connected to both said pinion gear and said output shaft;
   means for inhibiting the rotation of said output shaft;
   a variably engageable clutch comprises said input member and said output member;
   said variably engageable clutch is operable to variably transmit a fraction of the torque of said prime mover to said output shaft when said output shaft is at least partially inhibited from rotating by said inhibiting means.

6. A marine reduction gear, comprising:
   an input shaft, said input shaft being connectable in torque transmitting relation to a prime mover;
   an output shaft;
   means for variably transmitting torque between said prime mover and said output shaft, said torque transmitting means having an input member connected in torque transmitting relation with said input shaft and an output member connected in torque transmitting relation with said output shaft, said torque transmitting means being operable to permit slippage between said input and output members to occur continuously for a predetermined period of time;
   said torque transmitting means comprising a transfer gear connected in torque transmitting relation with both said input shaft and said input member;
   said torque transmitting means comprising a drive shaft connected to said output member, a pinion gear connected to said drive shaft and a bull gear connected to both said pinion gear and said output shaft;
   means for inhibiting the rotation of said output shaft;
   a variably engageable clutch comprises said input member and said output member;
   said variably engageable clutch is operable to variably transmit a fraction of the torque of said prime mover to said output shaft when said inhibiting means is deenergized and said output shaft is free to rotate.

7. A method of slowing the forward movement of a marine vessel, comprising:
   reducing the speed of a prime mover;
   engaging a brake to inhibit the rotation of a propeller of said marine vessel;
   disengaging an ahead clutch connected in torque transmitting association between said prime mover and said propeller;
   waiting until said propeller ceases rotation;
   partially engaging a variably engageable astern clutch connected in variable torque transmitting association between said prime mover and said propeller;
   partially disengaging said brake;

fully engaging said variably engageable astern clutch; and increasing the speed of a prime mover.

8. A marine reduction gear, comprising:

an input shaft being connectable in torque transmitting relation with an engine;

an ahead transfer gear;

an astern transfer gear connected in tooth mesh relation with said ahead transfer gear to rotate oppositely, said astern and ahead transfer gears being connected in torque transmitting relation with said input shaft;

a forward shaft connected through a first variably engageable clutch to said ahead transfer gear;

a reverse shaft connected through a second variably engageable clutch to said astern transfer gear;

a forward pinion gear connected in torque transmitting relation with said forward shaft;

a reverse pinion gear connected in torque transmitting relation with said reverse shaft;

a bull gear, said bull gear being connected in tooth mesh relation with said forward pinion gear, said bull gear being connected in tooth mesh relation with said reverse pinion gear;

a propeller shaft connected in torque transmitting relation with said bull gear;

a brake connected in rotation inhibiting relation with said bull gear; and one of said variably engageable clutches being operable to variably transmit a fraction of the torque of said input shaft to said propeller shaft when said propeller shaft is at least partially inhibited from rotating by said brake.

9. The reduction of gear of claim 8, wherein said brake is connected to said reverse pinion gear.

10. A marine reduction gear, comprising:

an input shaft being connectable in torque transmitting relation with an engine;

an ahead transfer gear;

an astern transfer gear connected in tooth mesh relation with said ahead transfer gear to rotate oppositely, said astern and ahead transfer gears being connected in torque transmitting relation with said input shaft;

a forward shaft connected through a first variably engageable clutch to said ahead transfer gear;

a reverse shaft connected through a second variably engageable clutch to said astern transfer gear;

a forward pinion gear connected in torque transmitting relation with said forward shaft;

a reverse pinion gear connected in torque transmitting relation with said reverse shaft;

a bull gear, said bull gear being connected in tooth mesh relation with said forward pinion gear, said bull gear being connected in tooth mesh relation with said reverse pinion gear;

a propeller shaft connected in torque transmitting relation with said bull gear;

a brake connected in rotation inhibiting relation with said bull gear, said brake being connected to said reverse pinion gear; and said second variably engageable clutch being operable to variably transmit a fraction of the torque of said input shaft to said propeller shaft when said propeller shaft is at least partially inhibited from rotating by said brake.

11. A marine reduction gear, comprising:

an input shaft being connectable in torque transmitting relation with an engine;

an ahead transfer gear;

an astern transfer gear connected in tooth mesh relation with said ahead transfer gear to rotate oppositely, said astern and ahead transfer gears being connected in torque transmitting relation with said input shaft;

a forward shaft connected through a first variably engageable clutch to said ahead transfer gear;

a reverse shaft connected through a second variably engageable clutch to said astern transfer gear;

a forward pinion gear connected in torque transmitting relation with said forward shaft;

a reverse pinion gear connected in torque transmitting relation with said reverse shaft;

a bull gear, said bull gear being connected in tooth mesh relation with said forward pinion gear, said bull gear being connected in tooth mesh relation with said reverse pinion gear;

a propeller shaft connected in torque transmitting relation with said bull gear;

a brake connected in rotation inhibiting relation with said bull gear, said brake being connected to said reverse pinion gear; and an engine connected to said input shaft; and said second variably engageable clutch being operable to variably transmit a fraction of the torque of said engine to said propeller shaft when said propeller shaft is at least partially inhibited from rotating by said brake, whereby a load is imposed on the engine to increase engine power output and avoid engine stall on abrupt reversal of the propeller shaft.

* * * * *